United States Patent Office 3,737,370
Patented June 5, 1973

3,737,370
PROCESS FOR MAKING PAPER AND PAPER MADE THEREFROM USING LIQUID CATIONIC STARCH DERIVATIVES
Wadym Jarowenko, Plainfield, and Morton W. Rutenberg, North Plainfield, N.J., assignors to National Starch and Chemical Corporation, New York, N.Y.
No Drawing. Continuation-in-part of application Ser. No. 15,199, Feb. 27, 1970, now Patent No. 3,666,751, which is a continuation-in-part of abandoned application Ser. No. 811,649, Mar. 28, 1969. This application Mar. 6, 1972, Ser. No. 232,237
Int. Cl. D21h 3/28
U.S. Cl. 162—175      8 Claims

ABSTRACT OF THE DISCLOSURE

Novel liquid cationic starch derivatives prepared by reaction of starch with epichlorohydrin-ammonium hydroxide condensates are useful as additives in the manufacture of paper wherein they increase the retention of inorganic pigments by the cellulose pulp and strengthen the resulting paper.

RELATED APPLICATIONS

This application is a continuation-in-part of our copending application Ser. No. 15,199, filed Feb. 27, 1970, now Pat. No. 3,666,751, which, in turn, is a continuation-in-part of application Ser. No. 811,649, filed Mar. 28, 1969, and now abandoned and assigned to the assignee of the subject application.

BACKGROUND OF THE INVENTION

Cationic starch derivatives are useful as additives in a variety of industrial applications. For example, cationic starch derivatives are often used in the paper manufacturing industry and in other industries as flocculating agents for colloidal solutions. Moreover, they are particularly useful as beater and/or headbox additives in the manufacture of paper wherein their inherent cationic charge significantly improves the retention of inorganic pigments, as well as of starch, by the cellulose pulp and thereby substantially increase the strength of the finished paper. U.S. Pat. 2,813,093, which issued on Nov. 12, 1957 to C. G. Caldwell and O. B. Wurzburg describes the preparation of a dry cationic starch by the etherification of starch molecules with a substituent radical containing a tertiary amino group. With dry cationic starches, however, it is ordinarily necessary to add water and heat or boil the resulting mixture so as to effect its dispersion before it can be utilized in most end use applications. Needless to say, there are many advantages in being able to prepare such cationic starch derivatives in liquid dispersed form. Thus, a distinct advantage of the dispersed cationic starch products of this invention is their ready applicability which is attained without requiring their dispersion as by cooking or mixing with water prior to their use. Other advantages includes, for example, the convenience afforded in being able to measure, by volume, the necessary concentration of cationic starch product which is to be used.

It is the prime object of this invention to provide a process for preparing cationic starch derivatives directly in liquid dispersed form.

It is another object of this invention to provide a cationic starch derivative in liquid dispersed form.

It is still another object to utilize these cationic starch derivatives in the manufacture of paper.

Various other objects and advantages of this invention will become apparent from the further disclosure which follows:

DETAILED DESCRIPTION OF THE INVENTION

We have now found that cationic starch derivatives can be prepared directly in liquid form, i.e. dispersed form, by means of a process whereby starch is reacted, under controlled conditions, with a condensate of epichlorohydrin and ammonium hydroxide.

It is believed the dispersed cationic starch derivatives of the present invention correspond to a formula given by the following:

$$\text{Starch}-\text{O}-\text{CH}_2-\text{CH}-\text{CH}_2-\text{N}-\text{CH}_2-\text{CH}-\text{CH}_2-\text{O}-\text{Starch};$$
$$\underset{\text{OH}}{|} \quad \underset{\text{CH}_2}{|} \quad \underset{\text{OH}}{|}$$
$$\underset{\text{HC}-\text{OH}}{|}$$
$$\underset{\text{H}_2\text{C}-\text{OH}}{|} \qquad \text{I}$$

$$\text{Y}-\text{CH}_2-\text{CH}-\text{CH}_2-\text{N}-\text{CH}_2-\text{CH}-\text{CH}_2-\text{O}-\text{Starch};$$
$$\underset{\text{OH}}{|} \quad \underset{\text{CH}_2}{|} \quad \underset{\text{OH}}{|}$$
$$\underset{\text{HC}-\text{OH}}{|}$$
$$\underset{\text{H}_2\text{C}-\text{Y}}{|}$$

and $$\text{Starch}-\text{O}-\text{CH}_2-\text{CH}-\text{CH}_2-\text{N}\overset{X}{\underset{X}{<}} \qquad \text{III}$$
$$\underset{\text{OH}}{|}$$

wherein
X is selected from the group consisting of $$-\text{H}, \; -\text{CH}_2-\text{CH}-\text{CH}_2-\text{O}-\text{Starch}, \; \text{and} \left[-\text{CH}_2-\text{CH}-\text{CH}_2-\text{N}\right]_n-Z$$
$$\underset{\text{OH}}{|} \qquad \qquad \underset{\text{OH}}{|} \quad \underset{Z}{|}$$

$n$ has a value of from 0 to 5,
Z is selected from the group consisting of $$\text{H}, \; -\text{CH}_2-\text{CH}-\text{CH}_2\text{OH}, \; -\text{CH}_2-\text{CH}-\text{CH}_2-\text{O}-\text{Starch}, \; \text{and R};$$
$$\underset{\text{OH}}{|} \qquad \qquad \underset{\text{OH}}{|}$$

Y is selected from the group consisting of —OH, —NH$_2$, $$-\text{N}\overset{H}{\underset{R}{<}}, \; -\text{N}\overset{R}{\underset{R}{<}}, \; \text{and} \left[-\text{N}\overset{R}{\underset{R}{<}}-\text{R}\right]-\text{A}$$

groups wherein R is selected from the group consisting of alkyl, hydroxyalkyl and carboxyalkyl groups with the alkyl portion thereof containing from about 1 to 4 carbon atoms and A represents an anion selected from the group consisting of chloride, bromide, iodide, phosphate, and sulfate anions.

It is to be noted that the actual value of $n$ is difficult to determine precisely. However, since these are condensation reactions, the probable forms may occur in varying proportions depending on reagent ratios and, to some degree, on reaction conditions.

It is well known that the cationicity of primary, secondary and tertiary amines is dependent upon the pH of the system. At low pH levels, these amines tend to be strongly cationic. At high pH levels these amines do not ionize and are, in essence non-ionic. Quaternary amines, on the other hand, are cationic under all pH conditions. By "cationic starch" is meant a starch carrying a positive charge which causes attraction or migration to the cathode. By the term "cationic starches" as used in the specification and claims herein, we mean starch products which contain any of the amine groups listed herein and mixtures thereof. Such starches are characterized by higher cationicity than the base from which the derivative was prepared. The presence of other modifying groups, such as anionic groups, on the starch would tend to change the degree of cationicity of the product, depending on the pH level of the system.

Accordingly, the products of our invention may properly be described as liquefied, i.e., dispersed, amine starch derivatives. In more details, now, the process which leads to the preparation of these novel derivatives may proceed as follows.

The starch, which comprises the base material for the reaction with the epichlorohydrin-ammonium hydroxide condensate, can be selected from among a number of starch types. Suitable starches include unmodified starch, as well as acid modified, dextrinized, hydrolyzed, oxidized, and derivatized starches such, for example, as starch ethers and starch esters which still retain reactive sites. The ester groups may, however, be hydrolyzed in the alkaline medium depending upon the specific reaction conditions. These starches may be derived from any sources including corn, wheat, potato, tapioca, waxy maize, sago, or rice, as well as from the so-called high amylose starches. Similarly applicable are the amylose and amylopectin fractions of starch. The use of the term "starch" is thus intended to include any amylaceous substances, whether modified or unmodified, which still retain free hydroxyl groups.

The epichlorohydrin-ammonium hydroxide condensate which is used to react with the starch is prepared by admixing epichlorhydrin with aqueous ammonium hydroxide in approximately equimolar proportions while maintaining the temperature of the system below about 60° C. and thereupon agitating the mixture for a period of from about 1.5 to 16 hours. Water may be used to dilute the reaction mixture if desired. It is to be understood that the condensation reaction between the epichlorohydrin and ammonium hydroxide should go essentially to completion and may, thus, require a longer reaction period at lower temperatures and a shorter reaction period at higher temperatures approaching 60° C It is desirable to obtain an essentially complete reaction between the epichlorohydrin and the ammonium hydroxide while avoiding any appreciable epichlorohydrin-ammonium hydroxide polymer formation. The condensation may be carried out at temperatures of from about 10 to 60° C., or higher. Preferably, a temperature of about 15° C. and a reaction period of from about 2 to 5 hours is used.

The proportions of epichlorohydrin and ammonium hydroxide which are used may vary within a range of from about 0.8 to 3 moles of epichlorohydrin to 1 mole of ammonium hydroxide. Condensates prepared using substantially more than 3 moles of epichlorohydrin tend to be more difficult to prepare and are less satisfactory in the process of the present invention since they tend to cross-link the starch to an undesirable degree and may thus require the use of special precautionary measures. On the other hand, condensates prepared using less than 0.8 mole of epichlorohydrin per mole of ammonium hydroxide lack reactive sites. Optimum results are obtained with the use of about equimolar portions of the two reagents. When the condensation is completed, the resulting reaction product may be used "as is," or it may be adjusted by evaporation or dilution to a solids content of at least about 10%, by weight. The evaporation is conducted under reduced pressure while maintaining the temperature at less than about 70° C. As an optional step, the pH of the liquid condensate may, if desired, be adjusted to a level of about 3.0 prior to its evaporation in order to prevent the occurrence of any further condensation reaction or polymer formation.

In reacting the starch with the epichlorohydrin-ammonium hydroxide condensate, the starch may be first suspended in water and the resulting suspension heated at temperatures from about 80 to 160° C. for a sufficient period of time to effect gelatinization of the starch. The concentration of the aqueous starch suspension may vary from about 1 part of starch to about 3 to 50 parts of water. Suspensions comprising 1 part of the starch to about 5 to 10 parts of water are most satisfactory.

After gelatinizing the starch, the mixture is cooled to about 40° C., although the temperatures may be adjusted to a range of 25 to 100° C. depending upon the gelatinization temperature, and a sufficient concentration of a base, such as an alkali metal hydroxide, quaternary ammonium hydroxide, tetramethyl guanidine, or the like, is thereupon added in order to maintain the mixture at a pH greater than 11 during the subsequent reaction. In a variation of the above procedure, the alkali may, if desired, be added prior to the gelatinization of the starch. With stirring, the epichlorohydrin-ammonium hydroxide condensate, as prepared by the above described procedure, is then added to the gelatinized starch and is allowed to react therewith at the temperature to which the gelatinized starch has been cooled, i.e. from about 25° to 100° C. and preferably at a temperature from about 35 to 45° C., for a period of about 4 to 18 hours until the reaction is essentially complete. Note that the reaction may also be conducted at elevated pressure utilizing reaction temperatures of from about 100°–130° C. If necessary, additional water may be added to dilute the reaction mixture. Upon completion of the reaction, the mixture, if desired, may be acidified to a pH level of from about 5 to 6 using any convenient acid, with hydrochloric or sulfuric acids being preferred for economic reasons. With regard to the proportions of starch and epichlorohydrin-ammonium hydroxide condensate which may be utilized, we prefer to use about 1 part, by weight, of the condensate solids with about 1 to 20 parts, by weight, of dry starch. The actual proportions chosen are dependent on the degree of conversion or fluidity of the particular starch used in the reaction. Thus, to achieve comparable retention performance, higher proportions of the epichlorohydrin-ammonium hydroxide condensate solids with respect to the starch are required where a thin boiling starch is used. On the other hand, where higher viscosity starches are used, lower proportions of the epichlorohydrin-ammonium hydroxide condensate solids with respect to the starch are required.

In a variation of the above described method for making the cationic starch products of our invention, we have found that they can also be prepared by a continuous process. In accordance with the latter process, a slurry is formed of the uncooked starch, water, reagent (the previously described epichlorohydrin-ammonium hydroxide condensate) and sufficient alkali to bring the pH of the slurry to about 11 throughout the course of the reaction. This slurry is then passed through a continuous cooker. The term "continuous cooker" refers to a type of equipment well known in the starch processing field, and comprises equipment through which a starch slurry is passed on a continuous basis and subjected to heat, usually in the form of injected live steam, so that the starch is discharged in a completely gelatinized ("cooked") state. When used to make the starch derivative of our invention, the continuous cooker method results in the essentially simultaneous gelatinization of the starch and its reaction with the epichlorohydrin-ammonium hydroxide condensate, with the liquid dispersed cationic starch product being discharged from the cooker in continuous fashion. One of the major advantages of this continuous method is its speed, the reaction taking place in fractions of a minute as contrasted to the hours required by the batch method at lower temperatures. The continuous method is advantageous, where the batch method is conducted at temperatures of from 100°–130° C., inasmuch as it enables the practitioner to avoid the cumbersome equipment and operations necessarily employed in the batch method. Furthermore, all of the processes and particularly the continuous method conveniently enables the practitioner to prepare the starch product at the site of its eventual application and thus have a continuous flow of product for immediate use.

While the proportion of reagent to starch is within the same magnitude as already described for the batch process, there are other conditions which require special care.

Remembering that the degree of gelatinization of starch in a continuous cooker system is affected by a number of variables, including the alkalinity of the slurry, the speed at which the slurry passes through the cooker and the temperatures achieved, it is important that the starch be subjected to sufficient heat within the cooker so as to achieve gelatinization and reaction of the starch. Ordinarily, this requires that the starch slurry within the continuous cooker be heated to at least 80° C., and preferably at least 120° C., the latter minimum temperature effecting a good balance of reaction efficiency and reaction time. Preferably, the epichlorohydrin-ammonium hydroxide condensate should be added immediately before the starch mixture is passed through the cooker in order to avoid crosslinking of the starch granules.

If desired, the reaction of the starch with the epichlorohydrin-ammonium hydroxide condensate may be carried out in the presence of a cross-linking inhibitor which acts to reduce the occurrence of cross-linking during the reaction. Such inhibitors include, for example, ammonium hydroxide; alkyl amines such as ethylamine, and diethylamine; alkanol amines such as ethanolamine, and triethanolamine; and alpha-chloro carboxylic esters and acids such as sodium chloroacetate. They may be present in a concentration of about 1 to 15%, by weight, based on the weight of the starch. Furthermore, we believe that when the reaction mixture is more extensively diluted with water and/or cross-linking inhibitors are utilized, the resulting reaction tends to produce a major proportion of mono-starch substituted derivatives, i.e. the products which are represented by Formula II and Formula III wherein both "X's" are hydrogen, as shown in the structural representation, hereinabove. Likewise, the use of a less dilute reaction medium and/or the complete omission or the use of smaller concentrations of cross-linking inhibitor would tend to result in the preparation of a major proportion of the tri-starch substituted product as illustrated in Formula III hereinabove, wherein each "X" in the latter formula represents the

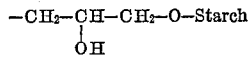

radical. The remaining possibilities, i.e. the derivatives representated by Formulas I and II and those derivatives represented by Formula III, wherein one of the "X" groups represents the —H radical and the remaining "X" group represents the

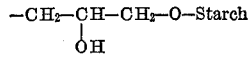

radical, will be produced in a mixture containing a major proportion of these latter types of derivatives under reaction conditions falling in between the two extremes called for in the previously described conditions with respect to the dilution and/or the use of cross-linking inhibitors.

Thus, it can be anticipated that any given reaction of starch with the epichlorohydrin-ammonium hydroxide condensate will produce a mixture of various liquid dispersed cationic starch derivatives coming within the scope of Formulas I, II and III with the precise composition of each mixture being determined by the character of the epichlorohydrin-ammonia condensate, the extent of the dilution of the reaction mixture, and/or the concentration of the cross-linking inhibitor. Detrimental cross-linking can also be avoided or reduced by great dilution of the reaction mixture with water, or by the use of converted starches. Ordinarily, it would have been expected that a reaction of this type would result in substantial cross-linking along with undersirable gel formation. It is surprising, therefore, that satisfactory products can, in fact, be obtained with the novel process of this invention.

The liquid dispersion of cationic starch derivative resulting from the above described process should have a solids content in the range of from 1 to 25%, by weight, depending largely upon the method of preparation and may be preserved against microbial deterioration by the addition of formaldehyde, phenolic bactericides, or other desired preservatives.

The novel products of this invention can be utilized as papermaking additives in order to improve the retention of starch and inorganic pigments by the stock, i.e. by the cellulose pulp, as well as to increase the strength of the paper. The dispersed starch derivatives of this invention may be employed in papers prepared from all types of cellulosic fibers and combinations of cellulosic and non-cellulosic fibers. The cellulosic fibers which may be used include bleached and unbleached soda, neutral sulfite, semi-chemical, chemi-ground wood and ground wood. Applicable non-cellulosic fibers include polyamide, polyester and polyacrylic resin fibers as well as mineral fibers such as asbestos and glass. Furthermore, these starch derivatives may be effectively used in the presence of a wide variety of paper additives such as clay, talc, titanium dioxide, calcium carbonate, alum, sizing agents, dyes, etc. and may be employed in any of the conventional methods of preparing paper sheets and other paper products. In practice, the cationic starch is introduced into the beater, hydropulper, stock chest, or headbox, or at any desired combination of the latter locations, at any point during the normal course of the papermaking process prior to the ultimate conversion of the wet pulp into a dry web or sheet, i.e. at any stage prior to passing the stock onto the drying stage. They may be employed in concentrations of at least about 0.1%, by weight, based on the solids content of the cationic starch product with respect to the dry weight of the dispersed pulp. On the other hand, there are no particular advantages to utilizing more than about 2.0%, by weight.

The following examples will further illustrate the embodiment of our invention. In these examples, all parts given are by weight unless otherwise noted.

EXAMPLE I

This example illustrates the preparation of several of the novel liquid cationic starches of the present invention and also demonstrates their utility as pigment retention aids in the manufacture of paper.

Part (A).—An epichlorohydrin-ammonium hydroxide condensate was prepared by slowly adding 185 parts (2.0 moles) of epichlorohydrin to 120 parts (2.0 moles) of concentrated ammonium hydroxide (29%) in 1,000 parts of water. The temperature was maintained at about 15° C. by the application of external cooling throughout the course of the addition. The mixture was agitated at room temperature for about 16 hours after which time it was evaporated to about 80% solids while under reduced pressure and while maintaining the temperature below 20° C.

Part B(1).—Fifty parts of thin boiling cornstarch which had been prepared by reaction of raw cornstarch with sodium hypochlorite solution until it had been converted to a degree known in the trade as 85 fluidity, were suspended in 250 parts of water, heated for twenty minutes on a boiling water bath, and cooled to 40° C. after which time 16.8 parts of a 50%, by weight, aqueous solution of sodium hydroxide was added. At this point, 31.5 parts of the epichlorohydrin-ammonium hydroxide condensate, as prepared in Part A hereinabove, were added with stirring while the temperature was maintained at 40° C. As the viscosity increased, the reaction mixture was gradually diluted by the addition of small portions of water. Thus, after 35 minutes, an additional 100 parts of water had been added. After 1.5 hours the system was acidified with 20 parts of concentrated hydrochloric acid. The final pH of the system was 5.2 and the resulting liquid cationic starch reaction product had a solids content of 13%, by weight.

Part B(2).—Twenty-five parts of thin boiling waxy maize starch which had been prepared by reaction of raw waxy maize starch with aqueous mineral acid until it had been converted to a degree known in the trade as 85 fluidity, were suspended in 250 parts of water, heated for 30 minutes on a boiling water bath, and cooled to 40° C., after which time 16.2 parts of a 50%, by weight, aqueous solution of sodium hydroxide was added. With stirring, 15.75 parts of the epichlorohydrin-ammonium hydroxide condensate, as prepared in Part A hereinabove, were added and the temperature was maintained at 40° C. for a total period of 18 hours. The system was then acidified with 20 parts of concentrated hydrochloric acid. The resulting liquid dispersed cationic starch reaction product had a solids content of 12%, by weight.

Part B(3).—Twenty-five parts of thin boiling waxy maize starch which had been prepared by reaction of raw waxy maize starch with aqueous mineral acid until it had been converted to a degree known in the trade as 85 fluidity, were suspended in 250 parts of water and 16.2 parts of a 50%, by weight, aqueous solution of sodium hydroxide was added with stirring. While stirring was continued, the mixture was heated to 40° C. and maintained at that temperature for about 1 hour. At this point, 1.7 parts of diethylamine followed by 15.70 parts of the epichlorohydrin-ammonium hydroxide condensate, as prepared in Part A hereinabove, were added and the reaction was continued at 40° C., with stirring, for a total of 16 hours. The system was then acidified with 20 parts of concentrated hydrochloric acid. The resulting liquid cationic starch reaction product had a solids content of 15%, by weight.

Part B(4).—The procedure of Part B(3) was repeated using 25 parts of thin boiling cornstarch as described hereinabove with the exception, in this instance, that the addition of the diethylamine was omitted. The resulting liquid cationic starch reaction product had a solids content of 15%, by weight.

In order to determine the effectiveness of these reaction products as pigment retention aids, each of the above described liquid cationic starches was added to the headbox during the normal course of a conventional papermaking process. In each case, the reaction product was added in a concentration of 0.25%, by weight, based on the solids content of the starch product with respect to the dry weight of the dispersed pulp. The cellulose pulp also contained 10% of titanium dioxide, based on the dry weight of the pulp. The degree of pigment retention, i.e. the percent, by weight, of the initially added pigment that was present in the resulting paper sheets in which these derivatives were homogeneously dispersed, was then determined by ashing the paper and weighing the resulting ash.

The following table presents the data obtained.

TABLE I

| Starch product | Starch solids, percent added | Percent retention of titanium dioxide | |
|---|---|---|---|
| | | pH 7.6 | pH 6.0 [1] |
| Product of— | | | |
| Part B(1) | 0.25 | 75 | 68 |
| Part B(2) | 0.25 | 68 | 61 |
| Part B(3) | 0.25 | 71 | 63 |
| Part B(4) | 0.25 | 66 | 66 |
| Control (untreated waxy maize) | 0.25 | 20–40 | |
| Blank [2] | 0 | 13–25 | 35–45 |

[1] Acidity adjusted with aluminum sulfate.
[2] The data for the blank were obtained from a series of determinations.

Thus, the above data clearly demonstrate the improved pigment retention which is achieved by the use of the novel liquid cationic starch derivatives of this invention.

Repetition of the tests at 0.1% and 2% gives like results. Economy dictates minimum starch addition.

In addition, the strength of the paper containing the liquid cationic starch was substantially increased as compared to the control sample.

EXAMPLE I-A

This example illustrates the preparation of additional novel liquid cationic starches of the present invention utilizing a continuous cooker and also demonstrates their utility as pigment retention aids in the manufacture of paper.

Part A(1).—The epichlorohydrin-ammonium hydroxide condensate used herein was prepared as described in Part A of Example I with the exception that the evaporation step was omitted and the reaction was conducted so as to result in a condensate having about 39% solids.

Part A(2).—The epichlorohydrin-ammonium hydroxide condensate was a reaction product of 3 moles of epichlorohydrin and 1 mole of ammonium hydroxide. The preparation involved the slow addition of 287.6 parts of epichlorohydrin to 59.5 parts of concentrated (35%) ammonium hydroxide solution which was dissolved in 350 parts of water while maintaining the temperature of the reaction mixture at 25–30° C. by external cooling. The mixture was agitated at room temperature for about 18 hours after which time it was evaporated to about 86% solids while under reduced pressure and while maintaining the temperature below 40° C.

Part B(1).—Seventy-five parts of waxy maize starch were slurried in 3.750 parts of water containing 8.5 parts of sodium hydroxide. To this slurry there was added 19.2 parts of the epichlorohydrin-ammonium hydroxide condensate, as prepared in Part A(1), hereinabove. Thereafter, the resultant mixture was passed through a continuous cooker at a rate of about 1.1 gallons per minute which was adjusted to raise the temperature of the contents to about 150° C. Lower temperatures in the pressure cooker may be used. These conditions allowed complete dispersion of the starch as well as its reaction with the epichlorohydrin-ammonium hydroxide condensate. The resulting liquid cationic starch product which was discharged from the pressure cooker had a solids content of 2.0%, by weight, and a final pH of 11.2.

Part B(2).—Seventy-five parts of potato starch were slurried in 3.750 parts of water containing 8.5 parts of sodium hydroxide. To this slurry there was added 38.4 parts of the epichlorohydrin-ammonium hydroxide condensate, as prepared in Part A(1), hereinabove. Thereafter the resultant mixture was passed through a continuous cooker at a rate of 1.4 gallons per minute at a temperature of about 150° C. which allowed complete dispersion of the starch as well as its reaction with the epichlorohydrin-ammonium hydroxide condensate. The resulting liquid cationic starch product which was discharged from the cooker had a solids content of 2.8%, by weight, and a final pH of 10.9.

Part B(3).—Sixty parts of waxy maize starch were slurried in 1,940 parts of water containing 4.8 parts of sodium hydroxide. To this slurry there was added 2.8 parts of epichlorohydrin-ammonium hydroxide condensate (3:1) as prepared in Part A(2), hereinabove. Thereafter, the resultant mixture was passed through a continuous cooker at the rate of about 1.0 gallon per minute which was adjusted to raise the temperature of the contents to about 150° C. These conditions allowed complete dispersion of the starch as well as its reaction with the epichlorohydrin-ammonium hydroxide condensate. The resulting liquid cationic starch product which was discharged from the cooker had a solids content of 2.2%, by weight, and a final pH of 10.5.

The effectiveness of these reaction products as pigment retention aids was determined according to the testing procedure described in Example I.

The following table presents the data obtained.

TABLE I-A

| Starch product | Starch solids, percent added | Percent retention of titanium dioxide | |
|---|---|---|---|
| | | pH 7.6 | pH 6.0 |
| Product of— | | | |
| Part B(1) | 0.25 | 66 | |
| Part B(2) | 0.25 | 63 | 71 |
| Part B(3) | 0.25 | 67 | |
| Blank | 0 | 13 | 42 |

[1] Acidity adjusted with aluminum sulfate.

The above data, likewise, clearly demonstrate the improved pigment retention which is achieved by use of the novel liquid cationic starch derivatives of this invention which in this instance had been prepared utilizing a continuous cooker.

The procedure of Part B(3) is repeated using twice the quantity of sodium hydroxide (9.6 parts in place of 4.8 parts) and the mixture is passed through the continuous cooker at a rate of about 100 ml./minute with the temperature adjusted to 80° C. The product gives similar pigment retention values.

EXAMPLE II

This example illustrates the preparation of a novel liquid cationic starch derivative using potato starch as the base for the reaction.

Ten parts of potato starch were suspended in 300 parts of water and 8 parts of a 50%, by weight, aqueous solution of sodium hydroxide was added with stirring. While stirring was continued, the mixture was heated to 40° C. and maintained at that temperature for about 1 hour. At this point, 5.1 parts of the epichlorohydrin-ammonium hydroxide condensate, as prepared in Part A of Example I hereinabove, were added and the reaction continued for a total of 16 hours. The system was acidified with 20 parts of concentrated hydrochloric acid. The resulting liquid cationic starch reaction product had a solids content of 6%, by weight.

When tested as a pigment retention aid in the manner described in Example I hereinabove, it was found that this product permitted the retention of 60%, by weight, of titanium dioxide at pH 7.6 and 65%, by weight, of the latter pigment at pH 6.0. Improved retention was also observed at other pH levels.

In another preparation, the above procedure was repeated using 10 parts of potato starch while 1.36 parts of diethylamine were introduced just prior to the addition of the epichlorohydrin-ammonium hydroxide condensate. The resulting liquid cationic starch product had a solids content of 5.6%, by weight.

When tested as a pigment retention aid in the manner described in Example I hereinabove, it was found that this product permitted the retention of 64%, by weight, of titanium dioxide at pH 7.6 and 71%, by weight, of the latter pigment at pH 6.0.

In another preparation 20 parts of potato starch were suspended in 980 parts of water and 16 parts of a 50%, by weight, aqueous sodium hydroxide solution are used. As in the procedure above, the mixture is heated with stirring at 40° C. for one hour. Then 15 parts of the epichlorohydrin-ammonium hydroxide condensate is added and the gelatinized starch reaction mixture placed in a pressure-cooker and heated at roughly 120° C. for 10, 20, or 30 minutes. When tested in pigment retention as described in Example I, the products are effective in retaining titanium dioxide.

EXAMPLE III

This example illustrates the preparation of additional samples of the novel liquid cationic starch products of this invention using raw waxy maize starch as the starch base.

Fifteen parts of raw waxy maize starch were suspended in 350 parts of water and 12 parts of a 50%, by weight, aqueous solution of sodium hydroxide were added with stirring. While stirring was continued, the mixture was heated to 40° C. and maintained at that temperature for 1 hour. At this point, 2.4 parts of diethylamine followed by 1.52 parts of the epichlorohydrin-ammonium hydroxide condensate, as prepared in Part A of Example I hereinabove, were added and the reaction continued for a total of 16 hours. The system was acidified to pH 5.0. The resulting liquid cationic starch product had a solids content of 6.4%, by weight.

When this product was tested as a pigment retention aid in the manner described in Example I hereinabove, it was found that it permitted the retention of 65%, by weight, of titanium dioxide with a paper stock which was at a pH of 7.6.

Similar pigment retention results were obtained with products which were prepared with diethylamine inhibitor using 10, 20, 30, 40 and 50%, by weight, respectively, of the epichlorohydrin-ammonium hydroxide condensate as based on the amount of dry starch. Comparable treatments based on raw waxy maize starch were prepared without diethylamine being present in the reaction system and were found to yield highly cross-linked products.

EXAMPLE IV

This example illustrates the attempted preparation of the novel liquid cationic starch products of this invention by means of a batch operation using temperatures and reaction periods outside of the specified ranges required for each of the latter variables.

Part A.—An epichlorohydrin-ammonium hydroxide condensate was prepared by slowly adding 92.5 parts (1.0 mole) of epichlorohydrin to 60 parts (1.0 mole) of concentrated ammonium hydroxide (29%) in 500 parts of water. The temperature was maintained at about 15° C. by the application of external cooling throughout the course of the addition. The mixture was agitated at room temperature for about 16 hours, acidified to about pH 3.0 with dilute hydrochloric acid and evaporated to dryness while under reduced pressure and while maintaining the temperature below 20° C.

Part B.—Forty parts of thin boiling waxy maize starch which had been prepared by reaction of raw waxy maize starch with aqueous mineral acid until it had been converted to a degree known in the trade as 85 fluidity, were suspended in 120 parts of water and heated for 30 minutes on a boiling water bath after which time 16.8 parts of a 50%, by weight, aqueous sodium hydroxide solution were added and the mixture cooled to room temperature. At this point, 45 parts of the epichlorohydrin-ammonium hydroxide condensate whose preparation was described in Part A of the example, were added with stirring, and samples of the reaction mixture were taken after a period of 0.5, 1.0, 2.0, and 20 hours, respectively. The reaction was terminated, in each instance, by the addition of concentrated hydrochloric acid in order to adjust the pH of the reaction product to a level of 4.0.

When tested as pigment retention aids in the manner described in Example I hereinabove, it was found that the first three products permitted the retention, at pH 7.6, of 52% or less, by weight, of titanium dioxide. The product obtained by the use of a 20 hour reaction period was in the form of a gel, indicative of excessive cross-linking, and could not therefore be tested.

EXAMPLE V

This example illustrates the preparation of two of the novel liquid cationic starch derivatives of this invention using potato starch as the base and wherein the epichlorohydrin-ammonium hydroxide condensates were prepared using other than equimolar proportions of the two reagents comprising the condensate.

Ten parts of potato starch were suspended in 300 parts of water and 8 parts of a 50%, by weight, aqueous solution of sodium hydroxide were then added with stirring. While stirring was continued, the mixture was heated to 40° C. and maintained at that temperature for about 1 hour. At this point, 5.1 parts of an epichlorohydrin-ammonium hydroxide condensate, prepared as described in Part A of Example I using 0.8 mole of epichlorohydrin and 1.0 mole of ammonium hydroxide, were added and the reaction was continued for a total of 16 hours. The system was then acidified with 20 parts of concentrated hydrochloric acid.

In another preparation which, in this instance used 10 parts of potato starch as the base for the reaction, the above procedure was repeated except that the condensate utilized was prepared by the reaction of 1.1 moles of epichlorohydrin with 1.0 mole of ammonium hydroxide.

When tested as pigment retention aids in the manner described in Example I hereinabove, each of the reaction products displayed results similar to those obtained with the [illegible]

wherein said cationic starch derivative is added in a concentration of at least about 0.1%, by weight, based on the solids content of said starch derivative with respect to the dry weight of the dispersed pulp.

5. The method of claim 4, wherein a crosslinking inhibitor is present during said reaction between the gelatinized starch and the epichlorohydrin-ammonium hydroxide condensate.

6. The method of claim 4, wherein said aqueous dispersion of said cationic starch derivative is prepared on the site of the papermaking machinery and, upon prepared, is fed continuously into the [illegible]

7. A paper containing [illegible] cationic starch [illegible]